US012590025B2

(12) United States Patent      (10) Patent No.:    US 12,590,025 B2
Ortner et al.                      (45) Date of Patent:       Mar. 31, 2026

(54) METHOD AND APPARATUS FOR PROCESSING GLASS ELEMENTS

(71) Applicant: SCHOTT AG, Mainz (DE)

(72) Inventors: Andreas Ortner, Gau-Algesheim (DE); Ulla Trinks, Mitterteich (DE); Fabian Wagner, Mainz (DE); Carsten Etz, Ingelheim (DE); Daniela Seiler, Dittelsheim-Heßloch (DE); Michael Kluge, Offenbach (DE); Peter Czepelka, Mainz-Kostheim (DE); Frank-Thomas Lentes, Bingen (DE); André Witzmann, Waldershof (DE); Reiner Artmann, Mitterteich (DE)

(73) Assignee: SCHOTT AG, Mainz (DE)

( * ) Notice: Subject to any disclaimer, the term of this patent is extended or adjusted under 35 U.S.C. 154(b) by 154 days.

(21) Appl. No.: 16/882,109

(22) Filed: May 22, 2020

(65) Prior Publication Data

US 2020/0369551 A1      Nov. 26, 2020

(30) Foreign Application Priority Data

May 22, 2019   (DE) ..................... 10 2019 113 635.0

(51) Int. Cl.
C03B 33/09        (2006.01)
C03B 17/04        (2006.01)
(Continued)

(52) U.S. Cl.
CPC ............ C03B 33/091 (2013.01); C03B 17/04 (2013.01); C03B 17/067 (2013.01); C03B 18/02 (2013.01); C03B 33/0955 (2013.01)

(58) Field of Classification Search
None
See application file for complete search history.

(56)                References Cited

U.S. PATENT DOCUMENTS

| 3,885,943 | A  | 5/1975 | Chui       |
| 9,701,564 | B2 | 7/2017 | Bookbinder |

(Continued)

FOREIGN PATENT DOCUMENTS

| CN | 102060437 | 5/2011  |
| CN | 106103367 | 11/2016 |

(Continued)

OTHER PUBLICATIONS

CN 107428588 machine translation, Fortsch et al., Method of cutting glass by means of a laser, and glass product produced according to said method, Dec. 2017 (Year: 2017).*

(Continued)

*Primary Examiner* — Queenie S Dehghan
(74) *Attorney, Agent, or Firm* — Ruggiero McAllister & McMahon LLC

(57)                ABSTRACT

A method for processing glass elements is provided. The method includes introducing a perforation line for parting a glass element introduced into the glass element during or after a hot processing process at an elevated temperature of at least 100° C. Spaced-apart filamentary flaws are introduced into the glass element along the predetermined course of the perforation line by a pulsed laser beam of an ultrashort pulse laser, and, during or after the introduction of the filamentary flaws, the glass element is cooled down so as to produce a temperature gradient, which induces a mechanical stress at the filamentary flaws, whereby the breaking force required for parting the glass element along the perforation line is reduced.

18 Claims, 6 Drawing Sheets

(51) Int. Cl.

| | |
|---|---|
| *C03B 17/06* | (2006.01) |
| *C03B 18/02* | (2006.01) |
| *C03B 33/095* | (2006.01) |

(56) References Cited

U.S. PATENT DOCUMENTS

| | | | | |
|---|---|---|---|---|
| 9,975,799 | B2 | 5/2018 | Bookbinder | |
| 2009/0032505 | A1* | 2/2009 | Huang | C03B 33/04 |
| | | | | 219/121.67 |
| 2015/0165560 | A1 | 6/2015 | Hackert | |
| 2015/0191388 | A1 | 7/2015 | Abramov | |
| 2017/0050877 | A1 | 2/2017 | Altman | |
| 2017/0197862 | A1 | 7/2017 | Bookbinder | |
| 2017/0283299 | A1* | 10/2017 | Bookbinder | C03B 33/0955 |
| 2018/0037490 | A1 | 2/2018 | Rossmeier | |
| 2018/0057390 | A1 | 3/2018 | Hackert | |
| 2018/0134606 | A1 | 5/2018 | Wagner | |
| 2018/0179100 | A1* | 6/2018 | Marjanovic | C03B 33/0222 |
| 2018/0297887 | A1 | 10/2018 | Spier | |
| 2018/0370840 | A1 | 12/2018 | Plapper | |
| 2019/0322564 | A1 | 10/2019 | Wagner | |

FOREIGN PATENT DOCUMENTS

| | | | | |
|---|---|---|---|---|
| CN | 106458693 | | 2/2017 | |
| CN | 107428588 A | * | 12/2017 | B65G 49/065 |
| CN | 107438585 | | 12/2017 | |
| CN | 107848861 | | 3/2018 | |
| CN | 108367962 | | 8/2018 | |
| CN | 108698900 | | 10/2018 | |
| CN | 208728911 | | 4/2019 | |
| DE | 102011006738 A1 | * | 10/2012 | C03B 33/0955 |
| JP | S60251138 | | 12/1985 | |
| JP | S6126530 | | 2/1986 | |
| JP | H05193969 | | 8/1993 | |
| JP | 2005263578 | | 9/2005 | |
| JP | 2011116611 | | 6/2011 | |
| KR | 20050113407 | | 12/2005 | |
| SU | 359800 | | 11/1972 | |
| WO | 2015095088 | | 6/2015 | |
| WO | 2015095091 | | 6/2015 | |
| WO | 2016007843 | | 1/2016 | |
| WO | WO-2016011114 A1 | * | 1/2016 | C03B 33/0235 |
| WO | WO-2016028580 A1 | * | 2/2016 | B23K 26/38 |
| WO | 2018122112 | | 7/2018 | |
| WO | WO-2019165269 A1 | * | 8/2019 | B23K 26/0006 |
| WO | WO-2020181023 A1 | * | 9/2020 | B23K 26/0624 |

OTHER PUBLICATIONS

DE 102011006738 machine translation, Dastis, Separating glass tube at separation point, Oct. 2012 (Year: 2012).*

WO2015132008 machine translation, Yeh, Li-Ya, Method for cutting a laminated ultra-thin glass layer, Sep. 2015 (Year: 2015).*

Machulka, "Laser processing of glass", Moscow, Soviet Radio, 1979 (p. 55 and p. 64, with English translation, 4 pages.

Din En 843-1, "Advanced technical ceramics—Mechanical properties of monolithic ceramics at room temperature—Part 1: Determination of flexural strength", Aug. 2008, 22 pages.

Li, "New materials science and technology, volume on metallic materials", Guangzhou: South China University of Technology Press, 2012.9, isbn 978-7-5623-3494-1, with English translation, 6 pages.

* cited by examiner

METHOD AND APPARATUS FOR PROCESSING GLASS ELEMENTS

CROSS REFERENCE TO RELATED APPLICATIONS

This application claims benefit under 35 USC 119 of German Application 10 2019 113 635.0 filed May 22, 2019, the entire contents of which are incorporated herein by reference.

BACKGROUND

1. Field of the Invention

The invention relates generally to the processing of glass by parting the glass along a desired separating line. In particular, the invention relates to a laser-assisted method for introducing separating lines.

2. Description of Related Art

In order to separate sheets of glass along an intended line, often the method of scoring and breaking is used. This involves the glass first being scored along a line and then broken by exerting a flexural stress at the line. However, this entails the problem that, particularly in the case of thick glasses, the edge face created at the line by parting may not run true, and then no longer be perpendicular to the side faces.

WO 2015/095088 A1 discloses a method for laser cutting display glass. In this method, after an overflow-fusion forming process of a glass ribbon, the border of the glass ribbon is cut off, the glass ribbon is cut to length and then a process of cutting to the desired formats is performed, in order to obtain a desired intended contour and size of glass sheets. The cutting may take place with an ultrashort pulse laser. A corresponding situation is also described by WO 2015/095091 A1.

U.S. Pat. No. 9,975,799 and WO 2016/007843 describe inter alia the separating of a vial formed from a glass ribbon by pressure thermoforming (known as a string-ribbon process) by filamenting along the neck of the vial and subsequently separating the vial along the filamentation line by introducing mechanical or thermal stresses, in particular by a $CO_2$ laser. The separating operation takes place shortly after the hot forming process.

The documents cited above have in common that an ultrashort pulse laser process is performed following the hot forming process, without any distinct time difference being provided between the preparation for breaking in the hot state and the separation of the substrate in the cold state.

Since the filamentation is a thermally-based process, it is not only dependent on the material properties such as the coefficient of thermal expansion, but also on the temperature of the workpiece during the processing. It has been found that there are significant differences between the filamenting of brittle material at room temperature and the same material at high temperatures: since the local temperature difference $\Delta T$ produced by the filamentation process falls with increasing workpiece temperature, much lower stresses are produced in the region of the filamentation at high workpiece temperatures than at lower substrate temperatures. The degree of damage in the material is then also correspondingly lower at high temperatures. This difference in the degree of damage around the filaments produced is manifested by much high breaking forces (in the case of filamentation at high workpiece temperatures), which additionally also have much greater variance.

SUMMARY

It has therefore surprisingly been found that, with increasing processing temperature during the filamentation process, the breaking forces necessary for opening the filamentation line and their variance increase. This effect continues up to the transformation temperature of the glass, on reaching which the cleavability of the material flaws produced drops dramatically. This effect is of considerable significance in the application of the filamentation method in the in-line process, in particular at high temperatures close to or in the hot forming range.

The invention is therefore based on the object of making the parting of glass elements following a hot process, such as in particular hot forming, easier and more reliable.

The effect of the decrease in cleavability at the separating line at high temperature can be counteracted by increasing the number of pulses in a burst and/or the burst frequency, whereby more severe flaws and—as a result—lower breaking forces are produced. The invention is however based on the realization that the breaking force and its variance can be greatly reduced if rapid cooling down is carried out in the region of the flaws introduced by the laser. The effect of lowering the breaking force and its variance that is brought about by forced cooling directly after the filamentation process in the region of the modified material is all the greater the higher the cooling rate: the higher the cooling rate, the greater the reduction in the breaking force.

Accordingly, the invention provides a method for processing glass elements in which a perforation line for parting a glass element is introduced into the glass element during or after a hot processing process at an elevated temperature of at least 100° C., preferably at least 200° C., particularly preferably at least 300° C., in that spaced-apart filamentary flaws are introduced into the glass element along the predetermined course of the perforation line by a pulsed laser beam of an ultrashort pulse laser, and wherein, during or after the introduction of the filamentary flaws, the glass element is cooled down so as to produce a temperature gradient, which induces a mechanical stress at the filamentary flaws, whereby the breaking force required for parting the glass element along the perforation line is reduced.

A corresponding apparatus for processing glass elements comprises an apparatus for hot processing the glass elements, and also a device for introducing a perforation line into the glass element, in order to part the glass element along the perforation line, wherein the device for introducing a perforation line comprises an ultrashort pulse laser, which is arranged and aligned such that it radiates onto a glass element in a region of the apparatus for processing glass elements in which the glass element still has a temperature of at least 100° C. before the heating during the processing in the apparatus for hot processing the glass elements, and wherein the glass element from the processing in the apparatus for hot processing the glass elements still has a temperature of at least 100° C., and wherein a moving device is provided, in order to move the point of impingement of the laser beam along an intended course of the perforation line, wherein the ultrashort pulse laser is set up to introduce filamentary flaws into the glass element, and wherein the apparatus for processing glass elements comprises a cooling device, which is arranged and designed such that it cools down the glass element during or after the introduction of the filamentary flaws the glass element so as to produce a temperature gradient, which induces a mechanical stress at the filamentary flaws, such that the breaking force required for parting the glass element along the perforation line is reduced, and typically so too is its variance. The breaking force and the variance are in this case reduced in comparison with filamentation in the hot state; by suitable cooling, a reduction in comparison with filamentation at room temperature can even be achieved. With the invention, therefore, apart from lowering the breaking force, the statistical distribution typical for the breaking of brittle materials is also diminished. This is very advantageous for increasing the reliability when parting the glass element, or reducing the probability of an uncontrolled break.

The elevated temperature at which the introduction of the perforation line takes place may not only be selected as described above as an absolute temperature. According to one embodiment of the invention, the selection of the temperature of the glass is based on the interval between room temperature and the glass transition temperature. According to a development, it is provided in this respect that a perforation line for parting the glass element is introduced into the glass element during or after a hot processing process at an elevated temperature, wherein the temperature is increased in comparison with a room temperature of 20° C. at least by half the temperature difference from room temperature up to the glass transition temperature. If, for example, the glass has a glass transition temperature of 520° C., half the difference from $T_g$ corresponds to a temperature increase of 250° C. Accordingly, the perforation line is introduced at a temperature of at least room temperature (20° C.)+250° C., that is to say at at least 270° C. According to a development, the introduction of the perforation line in this case takes place at a temperature which is at least room temperature plus three quarters of the temperature interval between room temperature and the glass transition temperature. In the case of the above example, this would therefore be a temperature of at least 20° C.+(¾)*500° C.=395° C.

Particularly preferably, the invention is used for hot processing processes in the form of hot forming processes. Therefore, according to a preferred embodiment, the apparatus for hot processing glass elements comprises an apparatus for the hot forming of glass elements. In particular, the hot forming may comprise the forming of the glass element from a melt.

To achieve effective lowering of the breaking forces by forced cooling directly after the filamentation process, or after the irradiation, it is possible to resort to cooling methods in combination with laser-based thermal separation, for example separation with a $CO_2$ laser. For example, blasting with air, other gaseous media or air/gas-liquid mixtures (aerosols) or quenching by immersion in a liquid (quenching) can be used. Quenching may also take place by a liquid curtain from a pouring nozzle, through which the glass element passes. It is favourable when cooling down that the contact of the modified region of the substrate causes at least local cooling of the region with the filamentary flaws to take place and thereby produce locally a thermal stress that increases microcracks around the filamentary modification, or filamentary flaw, and thus induces a further weakening of the material. The choice of cooling method may be made according to the requirements of the production constraints and process parameters concerned in the particular case.

The local quenching after the filamentation causes an increase in the stresses, and consequently increased formation or elongation of microcracks, so that the breaking stress required for the later separation is lowered as a consequence of the greater prior damage.

Particularly suitable as an ultrashort pulse laser for the purposes of the invention is a neodymium-doped yttrium-aluminium-garnet laser with a wavelength of 1064 nanometres. This laser may be used for all of the embodiments described in this disclosure. The average power of an ultrashort pulse laser suitable for the invention is preferably in a range from 20 to 300 watts. In order to achieve the filamentary flaws, according to an advantageous development of the invention a pulse energy in a burst of more than 400 microjoules is used, more advantageously an overall burst energy of more than 500 microjoules.

During the operation of the ultrashort pulse laser in the so-called burst mode, the repetition rate is the repetition rate of the emission of bursts. The pulse duration is essentially independent of whether a laser is operated in the single pulse mode or in the burst mode. The pulses within a burst typically have a similar pulse length, such as one pulse in the single pulse mode. The burst frequency may be in the range from 15 MHz to 90 MHz, preferably in the interval of 20 MHz to 85 MHz. According to an example, the burst frequency is for example 15 MHz, wherein the number of pulses in the burst is between 1 and 10 pulses, for example 6 pulses.

According to one embodiment of the invention, the average distance between adjacent filamentary flaws is generally 1 μm to 10 μm, preferably 3-8 μm.

In order to produce sufficient mechanical stress at the filamentary flaws to make the subsequent separating process easier, according to another embodiment it is provided that the glass element is cooled down at a cooling rate of at least 50° C. per second, preferably of at least 100° C. This does not have to apply to the entire cooled area, preferably at the surface, but at least at the location of the filamentary flaws. Preferably, the cooling is also carried out such that, at at least one point in time, a temperature gradient of at least 50° C. per millimetre is built up in each case at the location of the filamentary flaws. This temperature gradient may lie along the surface and/or in the volume of the glass. For example, when quenching the glass, the surface would be cooled over a large area, so that a temperature gradient of the surface into the interior of the glass is produced. The gradient then therefore runs in the longitudinal direction of the filamentary flaws.

BRIEF DESCRIPTION OF THE DRAWINGS

The invention is explained more precisely below on the basis of and with reference to the accompanying drawings.

DETAILED DESCRIPTION

Figure 1:
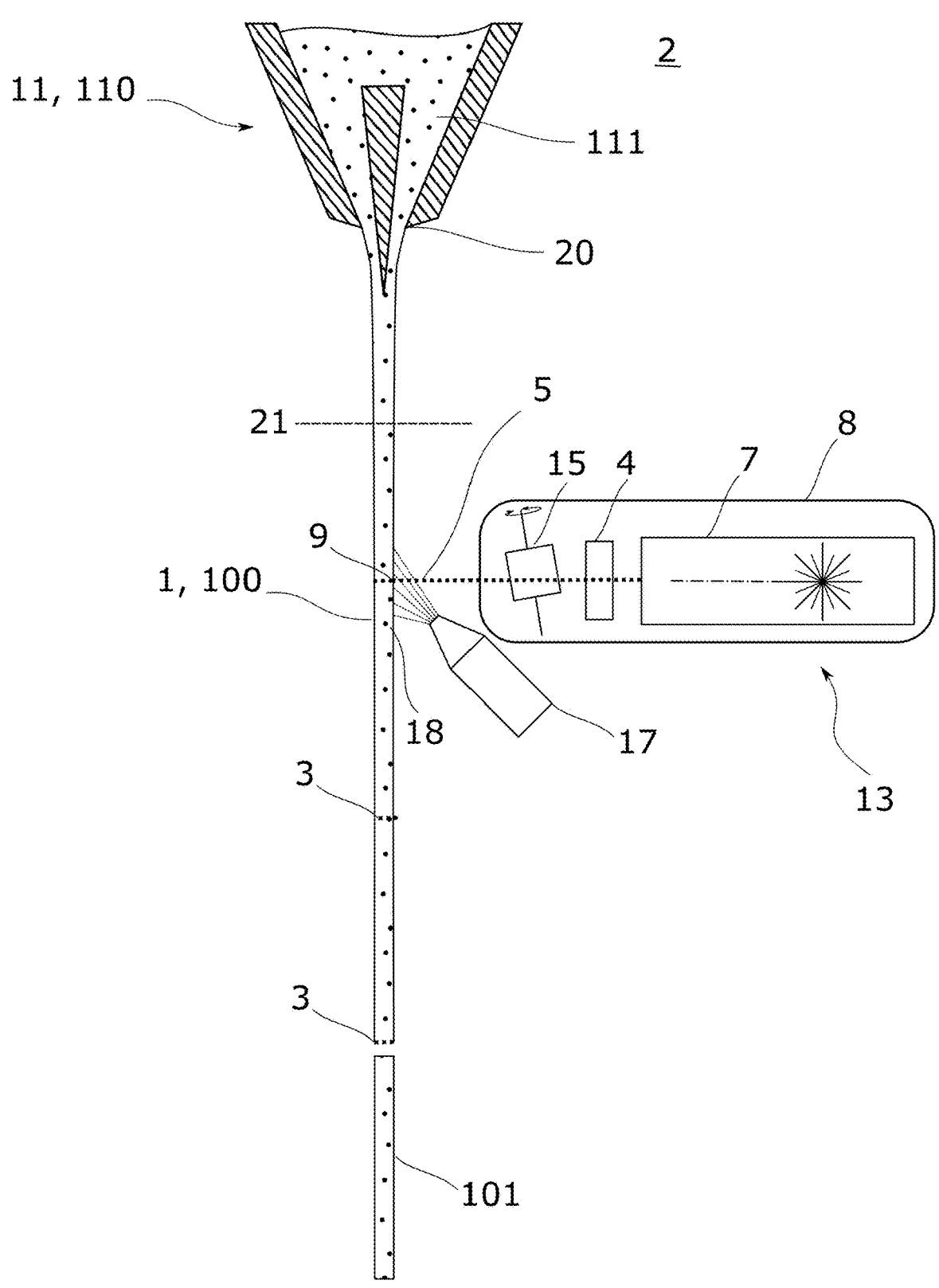
FIG. 1 shows an apparatus for processing glass elements.

FIG. 1 shows an embodiment, given by way of example, of an apparatus 2 for processing glass elements. In the context of this disclosure, the term processing also covers their production in general. Typical processing is the hot forming of glass elements. FIG. 1 is an example of such processing. Here, a glass element in the form of a continuous glass ribbon 100 is drawn through a downwardly directed slot-shaped nozzle 20 from a glass melt 111. This hot forming process for glass ribbons, or glass sheets, is also known as the down-draw process. Similarly possible is also hot forming on the basis of the overflow-fusion process. With increasing distance from the nozzle 20, the temperature of the glass falls, until at the position 21 the temperature is below the glass transition temperature Tg. Generally, without being restricted to the specific example shown, it is provided according to a preferred embodiment that the introduction of the perforation line takes place at a temperature of the glass below the glass transition temperature. It is however even possible to introduce the perforation line at least partially above the glass transition temperature. To be regarded then as an upper limit is the melting temperature, or a temperature at which the glass viscosity has a value of $10^4$ dPa·s. However filamentation at a temperature below the glass transition temperature is favourable, in order as far as possible no longer to influence the form and position of the filaments after introduction. This condition may also already be met at temperatures below the softening point, that is to say the temperature at which the viscosity has a value of $10^{7.6}$ dPa·s, since the glass is already dimensionally stable below this temperature. According to a development of the invention, it is therefore provided that the introduction of the perforation line 3 takes place at a temperature of the glass below the temperature at which the glass has a viscosity of $10^4$ dPa·s, preferably at a temperature below the softening point, in particular below the deformation temperature at a viscosity of $10^{11.5}$ dPa·s, particularly preferably at a temperature below the upper cooling point at a viscosity of the glass of $10^{13}$ dPa·s and most particularly preferably the below the glass transition temperature.

The apparatus 2 generally comprises a device 13 for introducing a perforation line 3 into the glass element 1. The perforation line 3 represents a deliberate predetermined breaking point or weakening of the material, such that the glass element 1 can be easily parted later along the perforation line 3. The device 13 comprises an ultrashort pulse laser 7, which is arranged and aligned such that it radiates onto the glass element 1, here that is the glass ribbon 100, in a region of the apparatus 2 for processing glass elements 1 in which the glass element 1 still has a temperature of at least 100° C.

As can be seen from the figure, the point of impingement of the laser beam 5 is however preferably at a position that is further away from the nozzle than the position 21 at which the glass reaches the glass transition temperature. The temperature of the glass consequently generally lies in a range between 100° C. and the glass transition temperature.

Generally, as shown, a beam-shaping optical unit 4 may be provided, in order to adapt the laser beam. In particular, the beam-shaping optical unit 4 can focus the laser beam 5, in order to increase the power density in the glass. The individual filamentary flaws 9 run in their longitudinal direction transversely, preferably perpendicularly, to the surface of the glass element 1, following the direction of propagation of the laser beam 5.

In the case of the example shown, the processing of the glass element 1 comprises the separation into individual glass sheets 101. The perforation lines 3 provide a controlled, clean break here. In order to introduce the perforation lines 3, comprising filamentary flaws 9 lying next to one another, in this example running perpendicularly to the plane of representation and perpendicularly to the longitudinal direction of the glass ribbon 100, the laser beam 5 is accordingly moved over the ribbon 100 perpendicularly to the longitudinal direction. For this purpose, a moving device 15 is provided, in order to move the point of impingement of the laser beam 7 along an intended course of the perforation line 3. This may involve both the laser beam being guided over the glass, and the glass being guided past the laser beam. Similarly, a combination of the two variants is possible. In order to move the laser beam 5 perpendicularly to the direction of movement of the glass ribbon 100, for example a galvanometer scanner may be used. Since the glass ribbon 100 at the same time advances of its own accord, the moving device 15 may guide the laser beam 5 over the glass elements 1 slightly obliquely, in order to compensate for the movement of the glass ribbon. The galvanometer scanner is therefore shown here arranged slightly obliquely. In order in this embodiment to ensure a course of cut that runs perpendicularly to the edge of the glass ribbon, the oblique positioning of the scanning mirror is dependent on the speed of the glass ribbon, and may be adapted if necessary.

Due to the special ambient conditions in the vicinity of the hot forming process, in particular in the case of forming from a glass melt as in the example shown, it is of advantage if, as shown, the beam-shaping optical unit 4 and further components of the device 13, if necessary, are arranged in a cooled enclosure 8. In particular, the laser 7 and/or the moving device 15 may also be arranged in the cooled enclosure 8. A cooled enclosure may advantageously be provided generally for an apparatus 2, without being restricted to the example of FIG. 1.

Once the perforation lines 3 comprising filamentary flaws 9 lying next to one another have been introduced, finally the individual glass sheets 101 may be cut off. One advantage of the method is that the distance that the glass covers can be shortened, since the preparation for separating is carried out while the glass is still hot. At the high temperatures of the glass—as explained above—the filamentary flaws introduced are generally not as pronounced as they are when processing at room temperature. In order nevertheless to achieve reliable and easy separability, during or after the introduction of the filamentary flaws 9 the glass element 1 is cooled down in a spatially confined manner, i.e. in the vicinity of the filamentary flaws, so as to produce a temperature gradient, which induces a mechanical stress at the filamentary flaws 9, whereby the breaking force required for parting the glass element 1 along the perforation line 3 is reduced. For this purpose, the apparatus 2 for processing glass elements 1 has a cooling device 17, which is arranged such that it cools down the glass element 1 during or as soon as possible directly after the introduction of the filamentary flaws 9 the glass element 1 such that the temperature gradient mentioned is produced. Particularly in the case of thin glasses, a high cooling rate is favourable in this case, in order to build up sufficient stresses. The cooling rate is preferably at least 50° C. per second.

According to a particularly preferred embodiment, the cooling device 17 comprises a nozzle 20 for emitting a cooling fluid jet 18. The cooling may for example take place by blasting with air, other gaseous media or aerosols (gas-liquid mixtures), preferably with air as a carrier. The cooling fluid may also be a liquid jet. According to one embodiment of the invention, it is therefore provided, without being restricted to the specific example shown, that the cooling down takes place by blasting with air or an aerosol or by spraying on of a liquid.

In a further embodiment, the cooling down is carried out by quenching in a cooler liquid preferred temperature lower than room temperature, particularly preferably lower than 0° C. This embodiment may take place as an alternative or in addition to the blasting. For example, after a first, more cautious cooling down by blasting, a rapid cooling down by quenching may take place.

Figure 2:
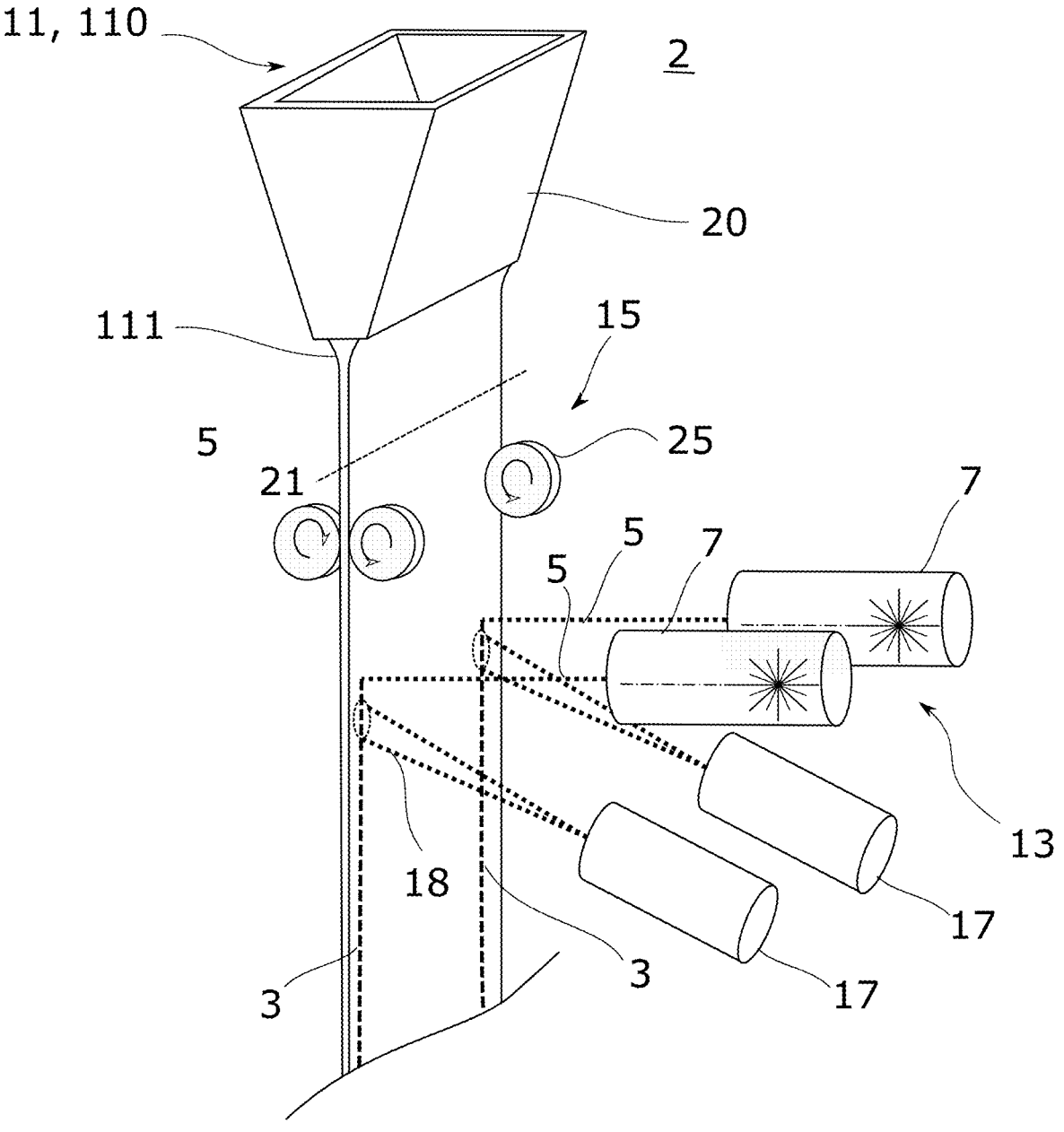
FIG. 2 shows a variant of the apparatus.

FIG. 2 shows an alternative or additional configuration of the embodiment according to FIG. 1. In the case of this embodiment of the apparatus 2 for processing glass elements 1, a continuous glass ribbon 100 is likewise drawn from a nozzle 20, in particular in the form of a thin glass ribbon. The drawing may, as shown, be performed by the down-draw process, or else by the overflow-fusion process. A further, generally applicable hot forming process is the redraw process, in which a preform is heated and drawn out. Generally, and without being restricted to the examples and drawing processes shown, the thickness of the glass ribbon preferably lies in the range from 0.01 mm to 20 mm, preferably in the range from 0.05 mm to 10 mm, in particular in the range from 0.1 mm to 4 mm, most particularly preferably in the range from 0.1 mm to 2 mm.

As a result of the process, this is accompanied by the forming of a so-called border (i.e. a "bead-like" thickening) at the two edges of the glass ribbon, which can be cut off inter alia by a laser process, for example with a $CO_2$ laser or with an ultrashort pulse laser. Because of the high breaking forces expended during the separating operation, this may be accompanied by cracks running into the glass ribbon, which may lead to destruction of the glass ribbon. Therefore, as shown in the example, the glass ribbon coming from the hot forming zone is filamented in the border region by means of two ultrashort pulse lasers 7, and directly thereafter cooled locally on one or both sides along the perforation line 3 by means of cooling devices 17 in the form of cooling nozzles. The cooling rate may be adapted here by controlling the flow rate of the cooling fluid to the process parameters (glass ribbon temperature and advancing rate) of the respective hot forming process, in order to prevent influencing of the glass ribbon 100 in the quality surface (producing stresses in the glass ribbon). The glass ribbon 100 prepared in this way may be cut off in the cold state (for example during or after the deflection into a horizontal part of the production line) by introducing a mechanical stress. One possibility for this is that of taking the perforation line 3 over a crowned roller.

The borders 102 run along the edges of the glass ribbon 100 in the longitudinal direction. Accordingly, the perforation lines 3 are also introduced in the longitudinal direction of the glass ribbon near the edges. In the case of this embodiment of the invention, the laser beam 5 may remain essentially fixed in place. The moving device 15 comprises here in particular drawing rollers 25, which draw off the glass ribbon 100 and consequently move it past the device 13 for introducing the perforation line 3, in particular past the one or more ultrashort pulse lasers.

Generally, without being restricted to the specific example shown, in summary according to one embodiment, a hot processing apparatus 11 is provided in the form of a hot forming apparatus 110 for drawing a glass element 1 in the form of an elongated glass ribbon 100, wherein the device 13 for introducing a perforation line 3 is set up for introducing perforation lines in the longitudinal direction of the glass ribbon 100 at which strip-shaped edge regions which each have a thickened border 102 can be cut off. As shown, the moving device 15 may comprise a drawing device, in particular drawing rollers 25. The embodiment can be applied analogously to other drawing processes, such as the up-draw process, the overflow-fusion process and the redraw process, and also to tube drawing processes, in particular to the Danner process or the Vello process.

Figure 3:
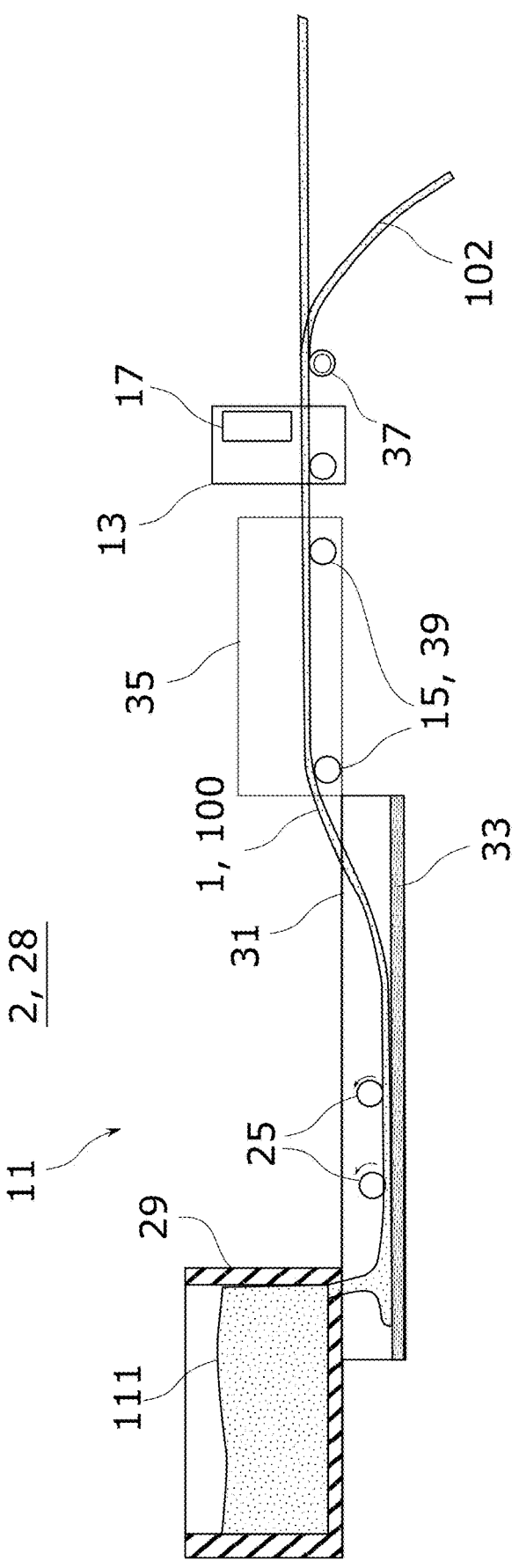
FIG. 3 shows an apparatus for producing float glass.

FIG. 3 shows yet another variant. The apparatus 2 shown here for processing glass elements 1 is again an apparatus for producing a glass ribbon 100. Here, the apparatus 11 for hot processing comprises a float tank 31. The glass melt 111 flows out of a melt tank 29 into the float tank 31 and is distributed there by drawing rollers and drawn out to form a glass ribbon 100 floating on a tin bath 33. The glass ribbon 100 subsequently runs through an annealing lehr 35. The device 13 for introducing a perforation line 3 is preferably arranged at the outlet of the annealing lehr 35. It is however also possible to introduce the perforation line before or in the annealing lehr. The cooling device 17 may be integrated in the device 13, or be arranged downstream of the device 13. For example, the cooling device may again comprise one or more cooling nozzles or else a liquid bath or a pouring nozzle for a liquid jet or curtain for locally quenching the glass.

Also in the case of the embodiment shown in FIG. 3, device 13 may serve the purpose of introducing perforation lines 3 at the edges, running in the longitudinal direction of the glass ribbon 100, in order to cut off the borders 102 of the glass ribbon 100. Generally a separating device 37, for example in the form of the already mentioned crowned rollers, may be provided for the cutting off. The border 102 is detached at the separating device 37 from the rest of the glass ribbon 100 and can then be caught in a cullet container. The transport of the glass ribbon 100 through the annealing lehr 35 takes place by transporting rollers 39, which accordingly form part of the moving device 15, with which the laser beam is guided over the glass element 1, or the glass ribbon 100.

Preferably, the temperature at the outlet of the annealing lehr is between 100° C. and 400° C. This is also a preferred temperature range generally, independently of the hot processing process. Likewise preferred is introduction of the perforation line 3 at a temperature at or below the lower cooling point, that is to say at a temperature at which the viscosity of the glass is at least $10^{13}$ dPa·s. This condition is typically met at the outlet of the annealing lehr. The temperature below the lower cooling point makes it possible to avoid the buildup of undesired permanent stresses during the cooling down by the cooling device 17. Therefore, according to a development of the invention, the perforation line line 3 is introduced at a position on the glass element 1 at which at least one of the aforementioned conditions is satisfied, that is to say a temperature in the stated range between 100° C. and 400° C. or below the lower cooling point. It goes without saying that this development of the invention is not restricted to the float process, but instead the stated temperature ranges can be used when introducing the perforation line in the case of all hot processing processes.

The float process is suitable particularly for the production of thicker glasses, with thicknesses in the range from 0.3 mm to 8 mm, preferably up to 4 mm. Such thicker glasses can however also be produced by the other stated drawing processes. Generally, without being restricted to the specific embodiments shown in FIG. 1 to FIG. 3, the apparatus 110 for hot forming therefore comprises an apparatus for producing a glass ribbon 100 by the down-draw process, the overflow-fusion process, the redraw process or the float process.

Figure 4:
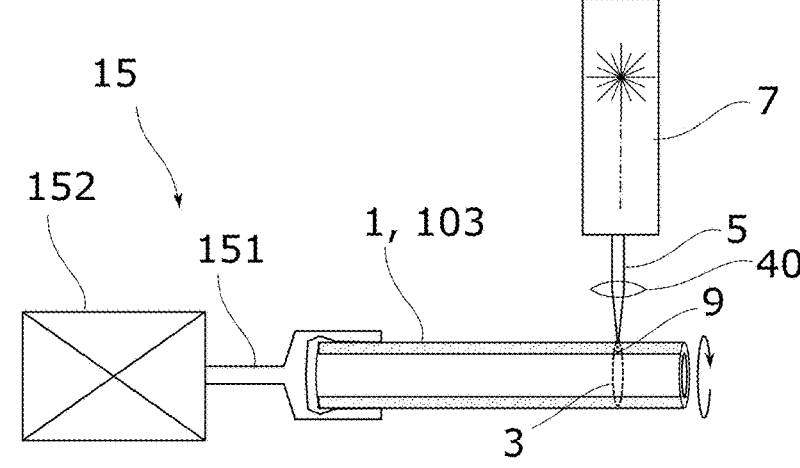
FIG. 4 shows an arrangement for introducing a perforation line into a glass tube.

There follows a description of examples for separating glass tubes. In this case, glass tubes (material: Fiolax clear; diameter: 6.85 mm; inner diameter: 4.85 mm) were heated in a tubular kiln to about 304° C. The temperature was measured with a pyrometer. The glass tubes were removed from the furnace and filamented along a circumferential circle directly while being rotated on a motor-driven spindle. FIG. 4 schematically shows the arrangement of the tube on the spindle 151, serving here as the moving device 15 and driven by a motor 152. The rotation during the irradiation by the laser beam 5 has the effect of producing a peripheral perforation line 3 on the glass tube 103. For producing the filamentary flaws 9, an ultrashort pulse laser 7 with a wavelength of 1064 nm was used. The laser beam 5 is focused on the glass element 1, or the glass tube 103, by a biconvex lens 40 as a beam-shaping optical unit 4 with a focal length of 20 mm. The raw beam diameter of the laser beam 5 was 12 mm. The ultrashort pulse laser was operated in burst mode with four pulses per burst. The rotational speed and the repetition rate of the laser were set such that the filamentary flaws were at intervals of 7 μm along the perforation line on the outer surface.

In a first series of measurements, the glass tubes 103 provided with a perforation line 3 were allowed to cool down without active cooling. In a second series of measurements, the glass tubes 103 were quenched with water. As a comparative test, in a third series of measurements, the glass tubes were processed with the ultrashort pulse laser at room temperature. Finally, in a fourth series of measurements, after filamenting at 304° C., the glass tubes 103 were cooled by forced cooling with a cooling nozzle by applying an air/water cooling mixture, or an air-water aerosol, along the perforation line. The volumetric flow was 0.2 ml/min. For each series of measurements, at least 24 samples were tested. The strength of the perforation lines 3 was determined in a modified flexural strength test in accordance with DIN EN 843-1 by determining the average breaking stress, or the Weibull parameter.

Figure 5:
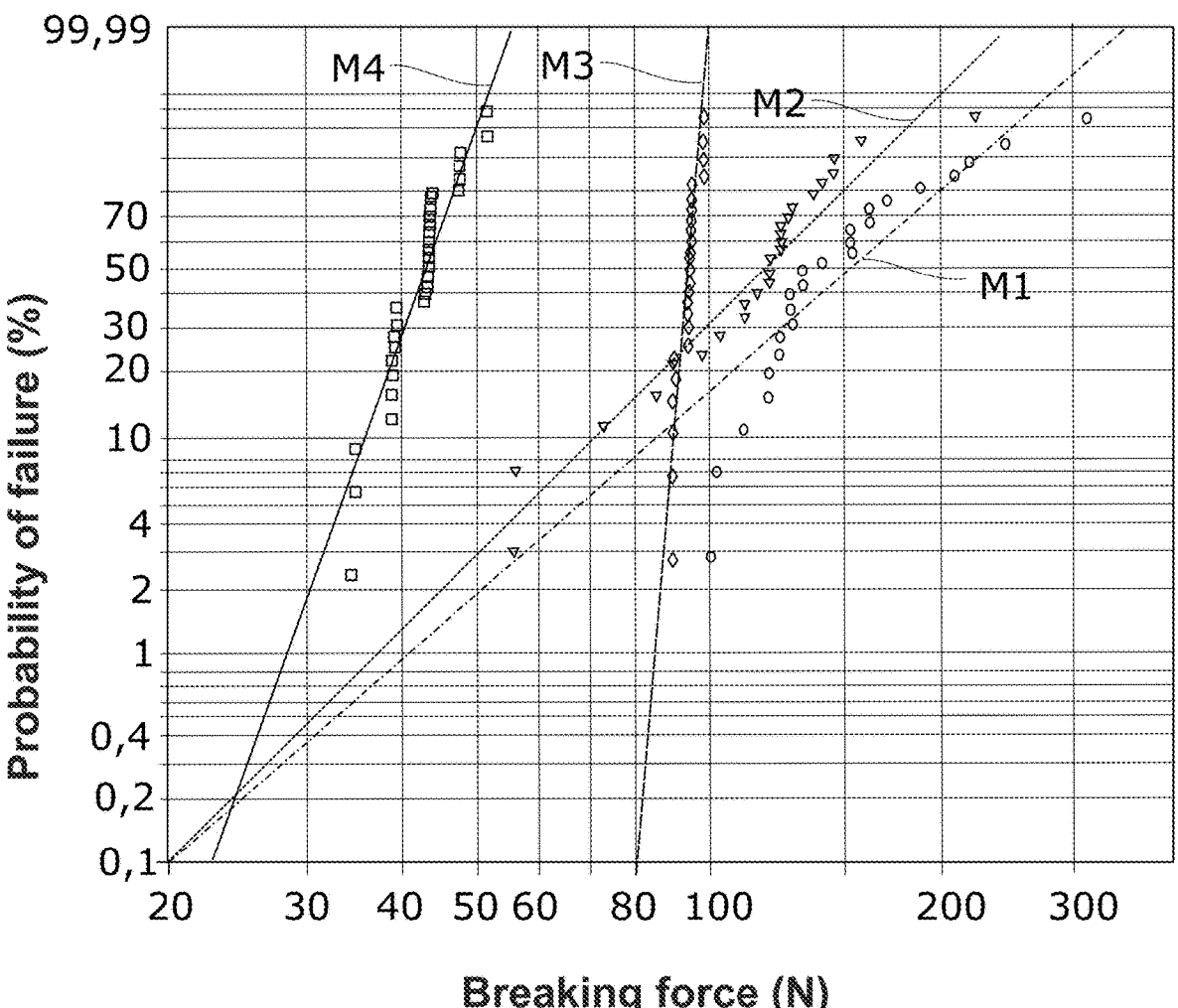
FIG. 5 is a diagram of the measured values of breaking forces when breaking up the perforation lines.

FIG. 5 shows the measurement results in a diagram with double-logarithmically scaled axes. The representation of this diagram corresponds to a Weibull diagram. The graphs of the measured values for the series of measurements 1 to 4 are denoted as M1 to M4. For better traceability of the series of measurements and for determining Weibull parameters, regression lines are included in each case for the individual graphs. The results are given in the following table:

| Series of measurements: | Number of samples | Breaking force average value N | Variance N |
|---|---|---|---|
| M1: perforation line introduced at 304° C., slow cooling down | 24 | 154.86 | 49.12 |
| M2: perforation line introduced at 304° C., cooling by quenching. | 24 | 118.08 | 34.44 |
| M3: | 25 | 94.06 | 2.66 |
| M4: | 30 | 42.49 | 4.41 |

It was found that, with defined local force cooling after filamentation in the hot state, the breaking forces are only half as great (with comparable variance) than in the case of filamentation at room temperature. With uncontrolled cooling over the surface area of the substrate after filamentation in the hot state, on the other hand, although the breaking forces are on average increased by more than 50% in comparison with the conditions at room temperature, the values still lie well below the breaking forces that occur in the case of slow cooling down.

Incidentally, only series of measurements 2 shows a distribution of the breaking force values that approximates a Weibull distribution. For the average value of 118 N and a variance of 34 N, here a characteristic value of 130 N and a Weibull modulus of 4.0 can also be calculated. The examples show that, with the invention, generally significant reductions of the breaking forces can be achieved.

Figure 6:
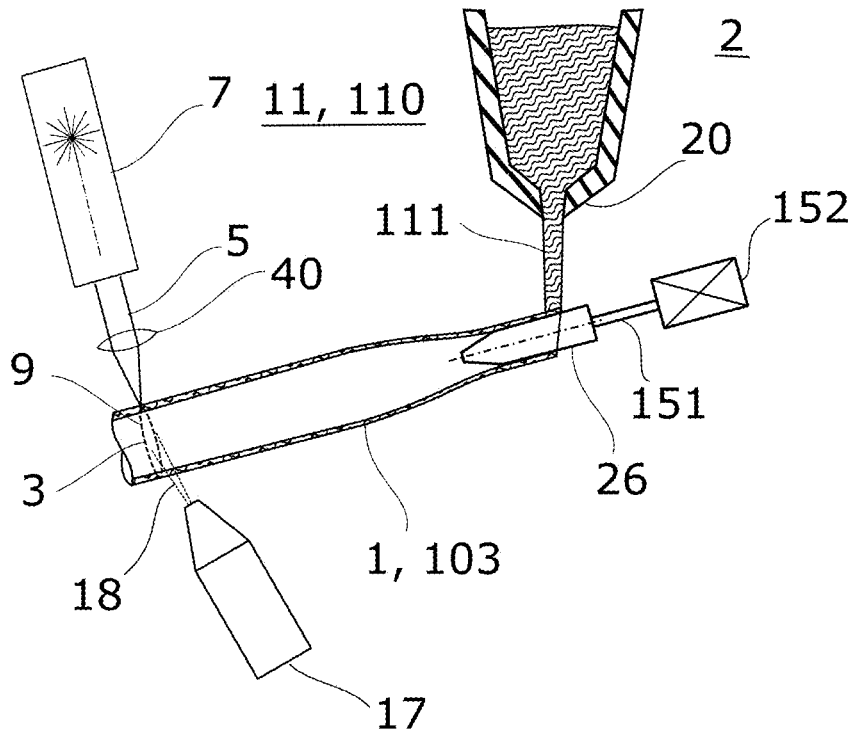
FIGS. 6 and 7 show apparatuses for producing glass tubes by the Danner process and the Vello process.

In the case of the example of FIG. 4, cut-to-size glass tubes were processed. The method according to this disclosure may however also be applied analogously to the examples described on the basis of. FIG. 1 to FIG. 3 in the case of the hot forming of tubes from a glass melt 111. FIG. 6 shows in this respect an example in which annular perforation lines 3 are introduced into a glass tube 103 continuously drawn by the Danner process. At these perforation lines 3, the glass tube 103 can then be divided up into shorter portions. In the case of this method, the glass melt 111 runs onto a spindle 26, which by way of a shaft 151 is set in rotation by a motor 152. The rotation has the effect that the glass melt distributes itself over the circumference of the spindle 26. At the same time, the tube thus produced is drawn from the spindle 26. Compressed air may be supplied through the spindle 26, in order to prevent the tube from collapsing behind the spindle 26. The rotation of the glass tube 103 already ensures that the laser beam 5 is guided over the circumference of the glass tube and introduces an annular perforation line 3 into the still hot glass, while tracking of the laser 7 in the axial direction at the advancing rate of the tube 103 is also expedient.

Figure 7:
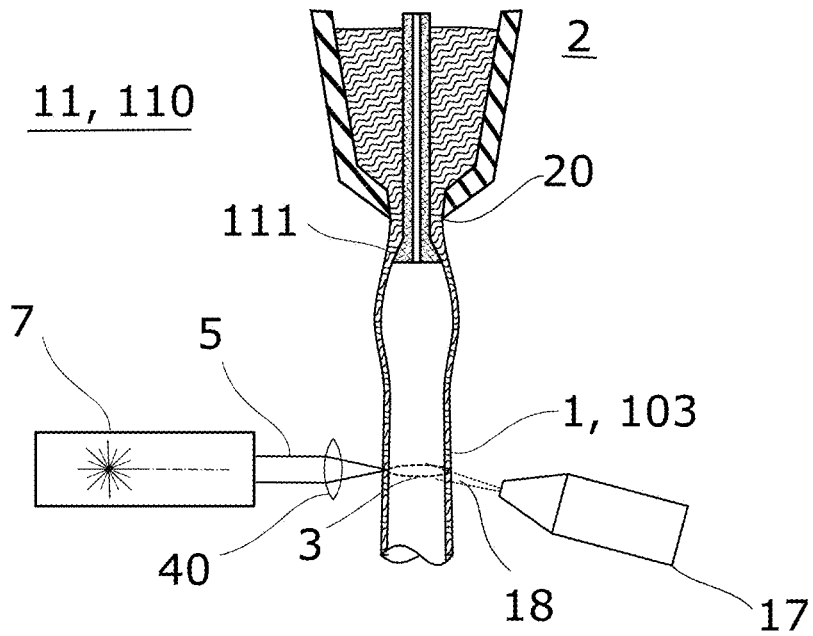

FIG. 7 shows a further example. In the case of the apparatus 2 shown here, a continuous glass tube 103 is drawn by the Vello process. The process is similar to the down-draw process as shown in FIG. 1, since the glass tube 103 is drawn downwards through a downwardly open nozzle 20. Arranged in the nozzle 20 is a mandrel 42, so that an annular nozzle gap is obtained. The glass melt 111 flows along the mandrel and is drawn off at the end of the mandrel 42 as a tube. Compressed air can be supplied through a central channel 44 in the mandrel 42, in order to prevent that the initially still soft tube collapses. In a way similar to in the case of the example of FIG. 6, an annular perforation line 3 is introduced with the laser 7 and cooled down locally by means of a cooling fluid jet 18, in order to reduce the breaking force.

Figure 8:
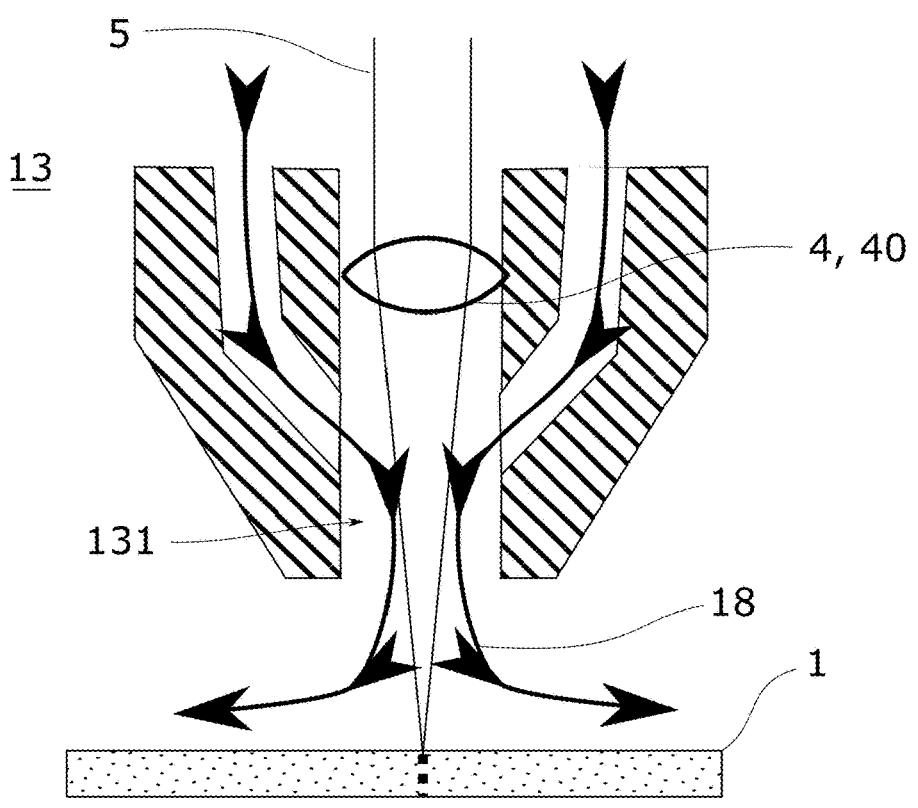
FIG. 8 shows a processing head.
Figure 9:
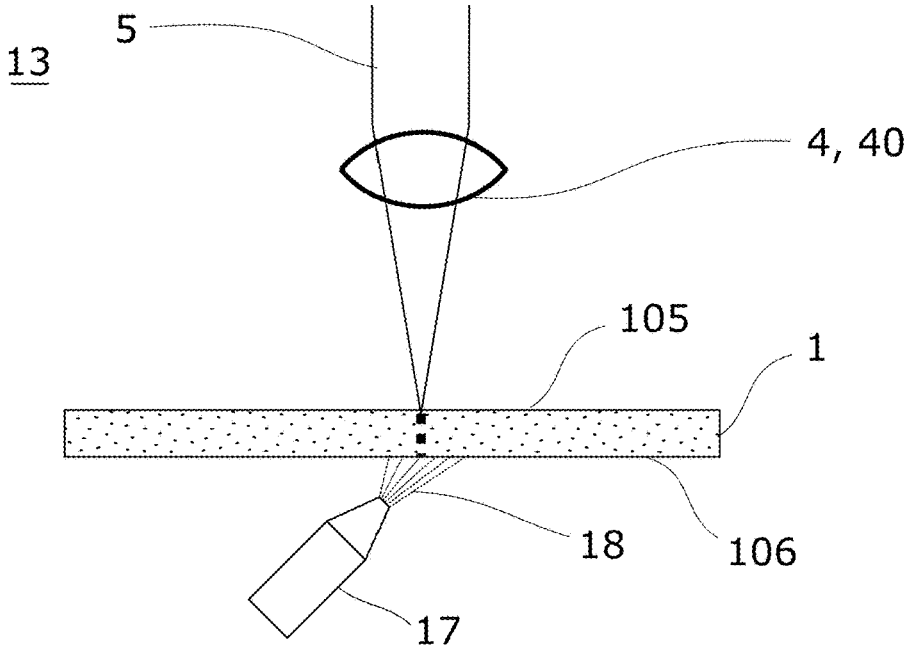
FIG. 9 shows an arrangement with cooling of the side opposite from the point of impingement of the laser beam.

Without restricting generality, the procedure described here, with filamentation on the hot glass and subsequent active cooling, may be performed in such a way that either—as described above—the two processes, that is to say introducing the perforation line with the ultrashort pulse laser and cooling, are carried out separately one after the other or else also take place at the same time. In the latter variant, it is possible to resort to the method of laser welding, in which the process gases are supplied to the working volume of the laser beam through a suitably designed welding head and, instead of the process gases, here the corresponding coolant is already supplied during the filamentation. According to one embodiment of an apparatus according to the invention for processing glass elements, it is provided in this respect that the device 13 for introducing a perforation line 3 comprises a head by which the laser light is radiated and the cooling fluid, in particular the cooling jet, is directed onto the glass element 1. FIG. 8 shows such a processing head 130. The processing head 130 has a channel 131, which is directed onto the glass element 1 and through which in this case both the laser beam 5 and the cooling jet 18 is guided, so that the point of impingement of the laser beam 5 lies in the cooling jet 18 and is surrounded by the cooling fluid. The configuration with a common channel is advantageous, but not imperative. Irrespective of the specific design, it is however provided in one embodiment of the invention that the device 13 for introducing the perforation line 3 comprises a processing head 130, by which both the laser beam 5 and the cooling jet are directed onto the glass element 1, so that the point of impingement of the laser jet 5 on the glass element 1 lies in the cooling jet 18. A compact arrangement in which generally the cooling fluid directly cools the region processed by the laser beam 5 is possible according to yet another embodiment, in which the cooling jet 18 is directed by a suitably arranged cooling device 17 onto the area of the glass element 1 at which the laser beam 5 leaves again, or in which the cooling jet is directed onto an area of the glass element 1 which lies opposite the area on which the laser beam 5 impinges. FIG. 9 shows an example of this variant. The laser beam passes in a focused state through the beam-shaping optical unit 4 with lens 40 onto the area 105, while the cooling jet 18 is directed onto the opposite area 106, but here likewise, as in the case of the embodiment according to FIG. 6, acts on the location where the irradiation occurs and produces a temperature gradient, and consequently a mechanical stress.

All of the examples shown have in common that the cooling takes place in a locally confined manner during or after the filamentation. Without being restricted to the specific examples shown, this is generally of advantage, in order to avoid stresses in the glass.

The invention is not restricted to the hot forming processes shown in the previous figures. Further hot processing processes are the baking in of ceramic colours, or decorations, and also coating processes, in which the glass is kept at an elevated temperature. Without being restricted to specific exemplary embodiments, according to one embodiment of the invention it is in this case provided that the hot processing process comprises at least one of the processes: ceramicizing of the glass element 1 for producing glass ceramic, shaping of a glass element in the form of a hollow, container or tube glass, thermal tempering, baking in of ceramic colours, and also the coating of the glass element.

LIST OF REFERENCE NUMERALS

| | |
|---|---|
| Glass element | 1 |
| Apparatus for processing glass elements | 2 |
| Perforation line | 3 |
| Beam-shaping optical unit | 4 |
| Laser beam | 5 |
| Ultrashort pulse laser | 7 |
| Cooled enclosure | 8 |
| Filamentary flaw | 9 |
| Apparatus for hot processing glass elements | 11 |
| Device for introducing a perforation line | 13 |
| Moving device | 15 |
| Cooling device | 17 |
| Cooling fluid jet | 18 |
| Nozzle | 20 |
| Position at temperature $T_g$ | 21 |
| Drawing roller | 25 |
| Spindle | 26 |
| Float apparatus | 28 |
| Melt tank | 29 |
| Float tank | 31 |
| Tin bath | 33 |
| Annealing lehr | 35 |

-continued

| | |
|---|---|
| Separating device | 37 |
| Transporting roller | 39 |
| Lens | 40 |
| Mandrel | 42 |
| Channel | 44 |
| Glass ribbon | 100 |
| Glass sheet | 101 |
| Border | 102 |
| Glass tube | 103 |
| Areas of 1 | 105, 106 |
| Hot forming apparatus | 110 |
| Glass melt | 111 |
| Processing head | 130 |
| Channel | 131 |
| Spindle | 151 |
| Motor | 152 |

What is claimed is:

1. A method for processing glass elements, the method comprising:

processing a glass element by a hot processing process;

introducing, by a pulsed laser beam of an ultrashort pulse laser, filamentary flaws into a surface of the glass element along a predetermined course of a perforation line during or immediately after the hot processing process that forms the glass element while the glass element is still at a temperature from the hot processing process of at least 100° C.; and guiding a cooling jet to the surface of the glass element immediately after the introducing the filamentary flaws at the temperature from the hot processing process and thereby cooling at least a region of the filamentary flaws with a temperature gradient of at least 50° C. per mm at the surface of the glass element to induce elongation of microcracks around the filamentary flaws and thereby reduce a breaking force required for parting the glass element at the perforation line.

2. The method of claim 1, wherein the hot processing process is forming the glass element from a glass melt or shaping the glass element into a hollow container or tube glass.

3. The method of claim 1, wherein the hot processing process comprises producing a glass ribbon with a thickness in the range from 0.01 mm to 20 mm.

4. The method of claim 1, wherein the temperature of at least 100° C. is selected from a group consisting of: below a temperature at which glass of the glass element has a viscosity of $10^4$ dPa·s, below a glass transition temperature of glass of the glass element, below a softening point of glass of the glass element, and at least room temperature plus three quarters of the difference between the glass transition temperature of the glass element and the room temperature.

5. The method of claim 1, wherein the cooling jet is applied to cool the glass element at a cooling rate of at least 50° C. per second.

6. The method of claim 1, wherein the cooling jet is applied at the filamentary flaws so that there is also a temperature gradient of at least 50° C. per mm from the surface into a volume of the glass element.

7. The method of claim 1, wherein the step of introducing the filamentary flaws comprises introducing the filamentary flaws at a position on the glass element where a temperature of the glass element is between 100° C. and 400° C. and/or where the temperature of the glass element is equal or less than a temperature at which a viscosity of the glass is at least $10^{13}$ dPa·s.

8. The method of claim 1, further comprising: hot forming a glass ribbon with a thickness in a range from 0.01 mm to 0.05 mm.

9. The method of claim 1, wherein the hot processing process is at least one hot processing process selected from the group consisting of: a down-draw process, an up-draw process, an overflow-fusion process, a redraw process, a float process, a Danner process, and a Vello process.

10. The method of claim 1, further comprising causing relative movement between the pulsed laser beam and the glass element during the introducing of the filamentary flaws.

11. The method of claim 10, further comprising positioning the pulsed laser beam at an oblique angle relative to a longitudinal direction of the glass element to compensate for the movement of the glass element during the introducing of the filamentary flaws.

12. The method of claim 11, further comprising adjusting the oblique angle based on a speed of the glass element relative to the pulsed laser beam to maintain the predetermined course of the perforation line.

13. A method for processing glass elements consisting of glass, the method comprising:

pulsing an ultrashort pulse laser so that a pulsed laser beam introduces spaced-apart filamentary flaws in a glass element along a perforation line at a surface of the glass element during or immediately after a hot processing process that forms the glass element while the glass element is still at an elevated temperature from the hot processing process of at least at least room temperature plus three quarters of the difference between the glass transition temperature of the glass element and the room temperature; and guiding a cooling jet to the surface of the glass element immediately after introducing the filamentary flaws while the glass element is still at the elevated temperature from the hot processing process to at least locally cool a region with the filamentary flaws to introduce a thermal stress that increases microcracks around the filamentary flaws and thereby reducing a breaking force required for parting the glass element along the perforation line.

14. The method of claim 13, wherein the hot processing process comprises producing a glass ribbon or a glass tube from a glass melt.

15. The method of claim 13, wherein the cooling jet comprises a medium selected from a group consisting of air, an aerosol, and a liquid.

16. The method of claim 13, wherein the hot processing process is forming the glass element from a glass melt or shaping the glass element into a hollow container or tube glass.

17. The method of claim 13, wherein the cooling jet locally cools the filamentary flaws so that there is also a temperature gradient of at least 50° C. per mm from the surface at the filamentary flaws into a volume of the glass element.

18. A method for processing glass elements, the method comprising:

hot forming a glass element by a hot forming process;

introducing filamentary flaws into a surface of the glass element with a laser beam of an ultrashort pulse laser that is guided to the surface of the glass element through a central channel of a processing head, wherein the filamentary flaws are introduced along a predetermined course along the surface to form a perforation line of spaced-apart filamentary flaws during or immediately after the hot forming process and while the glass element is at a temperature from the hot forming process of at least 100° C.; and guiding a cooling jet from a peripheral channel of the processing head into the central channel to apply cooling to the glass element with the cooling jet simultaneously with the introducing filamentary flaws so that a point of impingement of the laser beam lies in the cooling jet and is surrounded by a cooling liquid of the cooling jet to produce a temperature gradient of at least 50° C. per mm at the surface of the glass element along the predetermined course of the perforation line to induce a mechanical stress along the perforation line that reduces a breaking force required for parting the glass element at the perforation line.

* * * * *